United States Patent Office 3,493,658
Patented Feb. 3, 1970

3,493,658
ANTIMICROBIAL AGENTS
Karl-Julius Schmidt, Wuppertal-Vohwinkel, Fritz Steinfatt, Opladen, and Gerhard Schrader, Wuppertal-Cronenberg, Germany, assignors to Farbenfabriken Bayer Aktiengesellschaft, Leverkusen, Germany, a corporation of Germany
No Drawing. Filed Dec. 28, 1965, Ser. No. 516,681
Claims priority, application Germany, Jan. 2, 1965, F 44,870
Int. Cl. A61l *13/00*
U.S. Cl. 424—267                    1 Claim

ABSTRACT OF THE DISCLOSURE

Antimicrobial preparation and method of preserving aqueous preparations susceptible to microbial attack by utilizing an active amount of halocyano acetic acid amide.

---

The present invention relates to antimicrobial agents; more particularly it concerns antimicrobial agents consisting essentially of halocyano-acetic acid amides of the formula

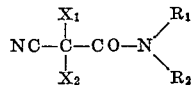

wherein $X_1$ is chlorine or bromine and $X_2$ is hydrogen, chlorine or bromine, whilst $R_1$ and $R_2$, independently of each other, stand for hydrogen or an alkyl radical containing 1 to 8 carbon atoms, and wherein $R_1$ and $R_2$ may also form, in conjunction with the nitrogen atom, a heterocyclic ring system.

Suitable halocyano-acetic acid amides are, for example, the following:

(1) $NC-CCl_2-CO-NH_2$,
(2) $NC-CClBr-CO-NH_2$,
(3) $NC-CBr_2-CO-NH_2$,
(4) $NC-CHBr-CO-NH-CH_3$,
(5) $NC-CCl_2-CO-NH-CH_3$,
(6) $NC-CClBr-CO-NH-CH_3$,
(7) $NC-CBr_2-CO-NH-CH_3$,
(8) $NC-CHBr-CO-N(CH_3)_2$,
(9) $NC-CBr_2-CO-N(CH_3)_2$,
(10) $NC-CHBr-CO-NH-C_3H_7(iso)$,
(11) $NC-CBr_2-CO-NH-C_3H_7(iso)$,

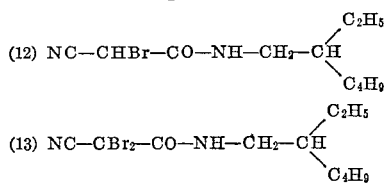

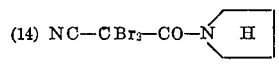

and

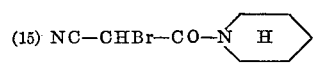

The antimicrobial agents according to the present invention are comparatively readily soluble in aqueous media and in many organic solvents; they inhibit the growth of microbes and, in many cases, even destroy them completely. They can, therefore, be used with outstanding success as preservatives, for example for spinning preparations, drilling oil emulsions, emulsions for the treatment of floors and for aqueous baths used for processing photographic films, especially also in those cases in which anion-active or non-ionic surface-active compounds are present. The halocyanoacetic acid amides of the present invention can also be used with good results as disinfectants in the form of aqueous solutions or as additives to wash liquors. Suitable proportions can readily be established by preliminary experiments; in general, an addition of 0.05 to 0.1%; referred to the material to be preserved or to be disinfected, has been found to be sufficient.

If, for example, a glucose broth which contains 2% of a commercial anion-active emulsifier based on paraffin sulphonate and 2% of a non-ionic emulsifier based on nonylphenol polyglycol ethers, is mixed with one of the halocyanoacetic acid amides mentioned above under (1) to (15) in a ratio of 1:1000, and the glucose broth is subsequently inoculated with bacteria, such as Bct. coli, Bct. proteus, Bct. pyocyaneum and Strc. glycerinaceus, with mould fungi, such as Aspergillus and Penicillium, or with yeasts, such as *Candida albicans*, then it is found that the inoculated microbes are practically destroyed after 2 weeks. In contrast, a commercial phenolic preservative, such as p-chloro-m-cresol, is not capable of destroying the inoculated microbes after 2 weeks, even when used in a ratio of 1:400.

The following examples serve to illustrate the invention without, however, limiting its scope; the parts given are parts by weight.

Example 1

A disinfectant cleaning agent is prepared from 10 parts of a commercial surface-active nonyl-phenol polyglycol ether, 10 parts of a commercial surface-active paraffin sulphonate, 5 parts of the compound $$NC-CBr_2-CO-NH_2$$

as antimicrobial agent and 75 parts water. In aqueous media which have been copiously inoculated with various types of bacteria this agent brings about a rapid destruction of germs as can be seen from the following table where the destruction of the specified bacteria is indicated in minutes at 22° C.

TABLE

| Dilution with water of the disinfectant cleaning agent | Bct. coli | Bct. pyocyan. | Bct. proteus |
|---|---|---|---|
| 1:100 | 2 | 2 | 4 |
| 1:200 | 2 | 2 | 6 |

Example 2

20 parts of a commercial drilling oil consisting of white oil and an anion-active emulsifier are stirred with 980 parts water to give an emulsion and subsequently further mixed, while stirring, with 1 part of the compound $NC-CBr_2-CO-NH-CH_3$ as antimicrobial agent. The emulsion is then excellently preserved for a long time. In contradistinction, the emulsion which is prepared without the addition of the antimicrobial agent shows, when used in the usual manner, a strong bacterial infection after a few days.

Example 3

1000 parts of a commercial aqueous solution which is used for the processing of photographic films and contains about 20% of a surface-active alkyl sulphate and 2% of a surface-active fatty alcohol polyethylene glycol ether, are treated with 1 part of the compound $$NC-CHBr-CO-N(CH_3)_2$$

as antimicrobial agent. The aqueous solution is then autosterile already after 24 hours and has practically an unlimited stability, whereas in an aqueous solution which has not been treated with the antimicrobial agent there form, after a storage of some weeks, slimy flakes of cocci and rod-shaped bacteria.

We claim:
1. A method for treating an aqueous preparation susceptible to bacterial or fungal attack, comprising admixing said preparation with an antimicrobial amount of a compound of the formula

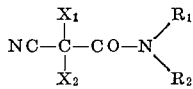

wherein
$X_1$ is chloro or bromo;
$X_2$ is hydrogen, chloro or bromo; and
$R_1$ and $R_2$ are independently defined as a member selected from the group consisting of hydrogen and alkyl of 1–8 carbon atoms, $R_1$ and $R_2$, in combination, being additionally defined as a member selected from the group consisting of pyrrolidinyl and piperidino.

References Cited

Chemical Abstracts (I), vol. 61, 1964, p. 6948(c).
Chemical Abstracts (II), vol. 61, 1964, p. 14524(a).
Chemical Abstracts (III), vol. 63, September 1965, pp. 8182–83(b) (a).
Chemical Abstracts (IV), vol. 53, 1959, p. 10207(b).
Chemical Abstracts (V), vol. 20, 1926, p. 365.
Chemical Abstracts (VI), vol. 62, 1965, p. 11695(c).
Chemical Abstracts (VII), vol. 54, 1960, p. 20059(i).
Chemical Abstracts (VIII), vol. 48, 1954, p. 5111(g).

FRANK CACCIAPAGLIA, JR., Primary Examiner

U.S. Cl. X.R.

96—61, 66; 252—8.55; 424—274, 304, 320